(12) United States Patent
Radivojevic et al.

(10) Patent No.: US 12,546,374 B2
(45) Date of Patent: Feb. 10, 2026

(54) SAFETY APPARATUS

(71) Applicant: Nokia Technologies Oy, Espoo (FI)

(72) Inventors: Zoran Radivojevic, Cambridge (GB); Hongwei Li, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 285 days.

(21) Appl. No.: 18/505,727

(22) Filed: Nov. 9, 2023

(65) Prior Publication Data

US 2024/0167530 A1      May 23, 2024

(30) Foreign Application Priority Data

Nov. 17, 2022   (EP) .................................... 22208004

(51) Int. Cl.

| | |
|---|---|
| *F16F 7/00* | (2006.01) |
| *G06F 3/01* | (2006.01) |
| *H04M 1/18* | (2006.01) |
| *H04M 1/72454* | (2021.01) |
| *H04R 1/02* | (2006.01) |
| *H04R 7/12* | (2006.01) |
| *H04R 23/00* | (2006.01) |

(52) U.S. Cl.
CPC ........ *F16F 7/00* (2013.01); *F16F 2224/0225* (2013.01); *G06F 3/016* (2013.01); *H04M 1/185* (2013.01); *H04M 1/72454* (2021.01); *H04R 1/028* (2013.01); *H04R 7/12* (2013.01); *H04R 23/002* (2013.01); *H04R 2400/03* (2013.01); *H04R 2499/11* (2013.01)

(58) Field of Classification Search
CPC .............. F16F 7/00; F16F 2224/0225; H04M 1/72454; H04M 1/185; H04R 7/12; H04R 23/002; H04R 1/028; H04R 2499/11; H04R 2400/03; G06F 3/016

USPC ........................................................... 137/14
See application file for complete search history.

(56) References Cited

U.S. PATENT DOCUMENTS

| | | | | |
|---|---|---|---|---|
| 10,638,210 | B1* | 4/2020 | El Guindi | ................ H04R 1/08 |
| 2002/0160857 | A1* | 10/2002 | Budzynski | ............. A63B 60/54 |
| | | | | 473/342 |
| 2008/0273738 | A1 | 11/2008 | Smith | .......................... 381/386 |
| 2011/0248935 | A1* | 10/2011 | Mellow | .................. H04R 1/025 |
| | | | | 345/173 |

(Continued)

FOREIGN PATENT DOCUMENTS

| | | |
|---|---|---|
| CN | 106375521 A | 2/2017 |
| CN | 107468000 A | 12/2017 |
| CN | 211266921 U | 8/2020 |

OTHER PUBLICATIONS

Schutt, F. et al., "Electrically powered repeatable air explosions using microtubular graphene assemblies," Materials Today, Elsevier Ltd., vol. 48, Amsterdam, NL, Sep. 2021, pp. 7-17.

*Primary Examiner* — Minh Q Le
(74) *Attorney, Agent, or Firm* — McCarter & English LLP (57) ABSTRACT

An apparatus, method and computer program is described including: a driver for driving a membrane of a gas-retaining chamber to induce vibrations in the membrane in a first mode of operation, wherein said membrane is configured to surround at least part of a device; and an activator for activating a rapid expander in a second mode of operation, wherein the expander comprises an expandable foam that is configured to inflate said chamber in response to an activation signal.

15 Claims, 7 Drawing Sheets

(56) References Cited

U.S. PATENT DOCUMENTS

| | | | | |
|---|---|---|---|---|
| 2015/0373441 A1* | 12/2015 | Behles | ............... | H04R 7/20 |
| | | | | 381/333 |
| 2017/0108894 A1* | 4/2017 | Tannous | ............... | H04B 1/3883 |
| 2018/0228259 A1* | 8/2018 | Lipner | ............... | H04R 1/44 |
| 2020/0145761 A1* | 5/2020 | Cho | ............... | H04R 7/16 |
| 2020/0280807 A1* | 9/2020 | Kim | ............... | H05K 1/181 |
| 2020/0322729 A1* | 10/2020 | Beckett | ............... | H04R 7/045 |
| 2020/0329304 A1* | 10/2020 | Yang | ............... | G06F 1/1684 |
| 2023/0263687 A1* | 8/2023 | Zhakypov | ............... | A61H 1/0288 |
| | | | | 601/40 |
| 2024/0031734 A1* | 1/2024 | Park | ............... | H04R 1/028 |
| 2024/0205323 A1* | 6/2024 | Jeong | ............... | H04M 1/02 |

* cited by examiner

SAFETY APPARATUS

FIELD

The present specification relates to a safety apparatus, such as a safety apparatus for use with an electronic device, such as mobile phones, computers (including tablet computers), cameras, drones and similar devices.

BACKGROUND

Some devices, particularly portable electronic devices (such as mobile phones, computers, cameras, drones etc.), are prone to breaking or being damaged if dropped on a hard floor. Many known shock absorbing techniques for use with such devices are bulky, expensive or of limited effectiveness.

SUMMARY

In a first aspect, this specification describes an apparatus, method and computer program comprising: driving a membrane of a gas-retaining chamber to induce vibrations in the membrane in a first mode of operation, wherein said membrane is configured to surround at least part of a device; and activating an expansion mechanism (e.g. a rapid expansion mechanism) in a second mode of operation. The expansion mechanism comprises an expandable foam that is configured to inflate said chamber in response to an activation signal.

In a second aspect, this specification describes apparatus comprising: a gas-retaining chamber (e.g. an air-retaining chamber) having a membrane, said chamber configured to surround at least part of a device in use; an expansion mechanism (e.g. a rapid expansion mechanism) comprising an expandable foam that is configured to inflate said chamber in response to an activation signal; means for driving the membrane to induce vibrations in the membrane in a first mode of operation; and means for activating said expansion mechanism in a second mode of operation. In the first mode of operation, the membrane may be used as a loudspeaker or as part of a haptics module. The second mode of operation may be a protection mode of operation. The gas-retaining chamber may be a sealed air chamber.

The expandable foam may be configured to trigger an air pressure burst within said chamber in order to inflate said chamber in said second mode of operation (to provide the expansion mechanism).

In some example embodiments, said foam is within said chamber or is in fluid communication with the chamber (at least in said first mode of operation).

The means for driving said membrane may be configured to induce vibrations at audible frequencies in said first mode of operation. Alternatively, or in addition, the means for driving said membrane may be configured to provide haptic feedback to a user in the first mode of operation.

Some example embodiments further comprise means for receiving the activation signal from said device. For example, a wired or wireless connection (e.g. Bluetooth®) may be provided for receiving the activation signal from said device. Accordingly, an apparatus is accordance with the invention may be separate to a device with which the apparatus is being used.

The apparatus may further comprise means for generating said activation signal. The activation signal may be generated by a drop detector. This means may form part of the apparatus, or may be separate to the apparatus. For example, the apparatus may receive an activation signal from a device being protected by the apparatus. The means for generating said activation signal may comprise at least one of an inertial measurement unit, an accelerometer, a gyroscope or an imaging device (e.g. a camera, such as a camera with a high sampling rate).

The foam may be one of a graphene enabled electric foam or a graphene flake enriched conductive foam.

The expansion mechanism may be configured to deflate said chamber in response to a removal of said activation signal.

In a third aspect, this specification describes a method comprising: driving a membrane of a gas-retaining chamber (e.g. an air-retaining chamber) to induce vibrations in the membrane in a first mode of operation, wherein said membrane is configured to surround at least part of a device; and activating an expansion mechanism (e.g. a rapid expansion mechanism) in a second mode of operation, wherein the expansion mechanism comprises an expandable foam that is configured to inflate said chamber in response to an activation signal. In the first mode of operation, the membrane may be used as a loudspeaker or as part of a haptics module. The second mode of operation may be a protection mode of operation.

Activating said (rapid) expansion mechanism may comprise driving said expandable foam.

The expandable foam may be configured to trigger an air pressure burst within said chamber in order to inflate said chamber in said second mode of operation.

In some example embodiments, said foam is within said chamber or is in fluid communication with the chamber.

Driving said membrane may be configured to induce vibrations at audible frequencies in said first mode of operation. Alternatively, or in addition, driving said membrane may be configured to provide haptic feedback to a user in the first mode of operation.

Some example embodiments further comprise receiving the activation signal from said device. For example, a wired or wireless connection (e.g. Bluetooth®) may be provided for receiving the activation signal from said device.

The method may further comprise generating said activation signal. The activation signal may be generated by a drop detector. The activation signal may be generated by at least one of an inertial measurement unit, an accelerometer, a gyroscope or an imaging device (e.g. a camera, such as a camera with a high sampling rate).

The foam may be one of a graphene enabled electric foam or a graphene flake enriched conductive foam.

The expansion mechanism may be configured to deflate said chamber in response to a removal of said activation signal In a fourth aspect, this specification describes an application comprising: a first input to enable a user to activate the application; a control module for generating an activation signal in the event that one or more sensor inputs are indicative a device having been dropped (e.g. using inertial measurement unit, an accelerometer, a gyroscope or an imaging device); and an output for driving an expansion mechanism of said device in response to said activation signal, wherein the expansion mechanism comprises an expandable foam that is configured to inflate (e.g. rapidly inflate) said membrane in response to said output. The application may also comprise means for driving the membrane to induce vibrations in the membrane in a first mode of operation (e.g. for operation and a loudspeaker and/or a haptics module).

In a fifth aspect, this specification describes a system comprising an apparatus as described herein (including the apparatus of the second aspect described above) or an apparatus configured to implement any method as described herein (including the method of the third aspect described above), the system further comprising the said device.

In a sixth aspect, this specification describes computer-readable instructions which, when executed by a computing apparatus, cause the computing apparatus to perform (at least) any method as described herein (including the method of the third aspect described above).

In a seventh aspect, this specification describes a computer-readable medium (such as a non-transitory computer-readable medium) comprising program instructions stored thereon for performing (at least) any method as described herein (including the method of the third aspect described above).

In an eighth aspect, this specification describes an apparatus comprising: at least one processor; and at least one memory including computer program code which, when executed by the at least one processor, causes the apparatus to perform (at least) any method as described herein (including the method of the third aspect described above).

In a ninth aspect, this specification describes a computer program comprising instructions for causing an apparatus to perform at least the following: drive a membrane of a gas-retaining chamber to induce vibrations in the membrane in a first mode of operation, wherein said membrane is configured to surround at least part of a device; and activate an expansion mechanism (e.g. a rapid expansion mechanism) in a second mode of operation, wherein the expansion mechanism comprises an expandable foam that is configured to inflate said chamber in response to an activation signal. Optional features of the ninth aspect may comprises any feature of the second or third aspects described above.

In a tenth aspect, this specification describes: a control module (or some other means) for driving a membrane of a gas-retaining chamber to induce vibrations in the membrane in a first mode of operation, wherein said membrane is configured to surround at least part of a device; and the control module (or some other means) for activating an expansion mechanism (e.g. a rapid expansion mechanism) in a second mode of operation (e.g. a protection mode of operation), wherein the expansion mechanism comprises an expandable foam that is configured to inflate said chamber in response to an activation signal. In the first mode of operation, the membrane may be used as a loudspeaker or as part of a haptics module.

BRIEF DESCRIPTION OF THE DRAWINGS

Example embodiments will now be described, by way of example only, with reference to the following schematic drawings, in which.

DETAILED DESCRIPTION

The scope of protection sought for various embodiments of the disclosure is set out by the independent claims. The embodiments and features, if any, described in the specification that do not fall under the scope of the independent claims are to be interpreted as examples useful for understanding various embodiments of the disclosure.

In the description and drawings, like reference numerals refer to like elements throughout.

Some devices, particularly portable electronic devices (such as mobile phones, computers, cameras, drones etc.), are prone to breaking or being damaged if dropped on a hard floor or some other surface or the like. Such devices are often expensive to repair. Moreover, the size and weight of many portable electronic devices (such as mobile phones) is increasing, typically resulting in increased damage when such devices are dropped. Although soft cases can provide some protection against breakages, the provision of large cases (that may be needed for high effectiveness) can lead to a clumsy form factor.

Figures 1, 2, 3:
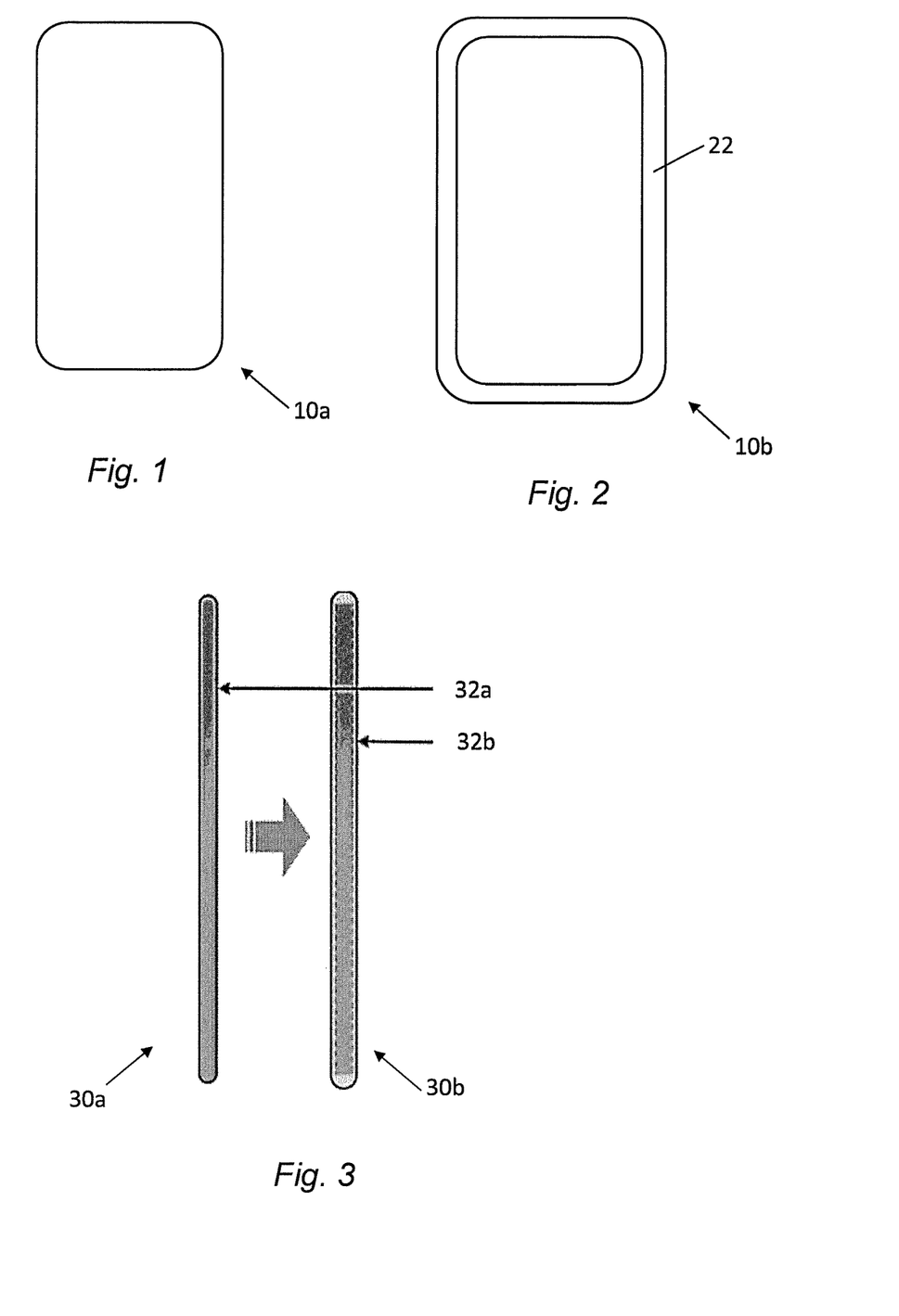
FIG. 1 shows a device in accordance with an example embodiment in a first configuration.
FIG. 2 shows the device of FIG. 1 in a second configuration.
FIG. 3 is a side view of a device in use in accordance with an example embodiment.

FIGS. 1 and 2 show a device, indicated generally by the reference numeral 10, in accordance with an example embodiment. The device 10 may be a portable electronic device, such as a mobile phone. FIG. 1 shows the device 10 in a first configuration 10a. FIG. 2 shows the device 10 in a second configuration 10b.

The device 10 includes inflatable gas-retaining (e.g. air filled) chamber 22 surrounding the device. This chamber is deflated in the first configuration of FIG. 1 and is inflated in the second configuration of FIG. 2.

FIG. 3 is a side view of a device in use, indicated generally by the reference numeral 30, in accordance with an example embodiment. The device is shown transitioning from a first configuration 30a (similar to the device 10a described above) to a second configuration 30b (similar to the device 10b described above). The device in the first configuration 30a includes a deflated chamber 32a. The device in the second configuration 30b includes an inflated chamber 32b.

When the chamber 22 or 32 is inflated (in the second configuration), the chamber can be used to protect the device, for example, by forming an air balloon bubble around the device to damp mechanical shock. In particular, the edges of a device can be protected in the event that the device is dropped.

Figure 4:
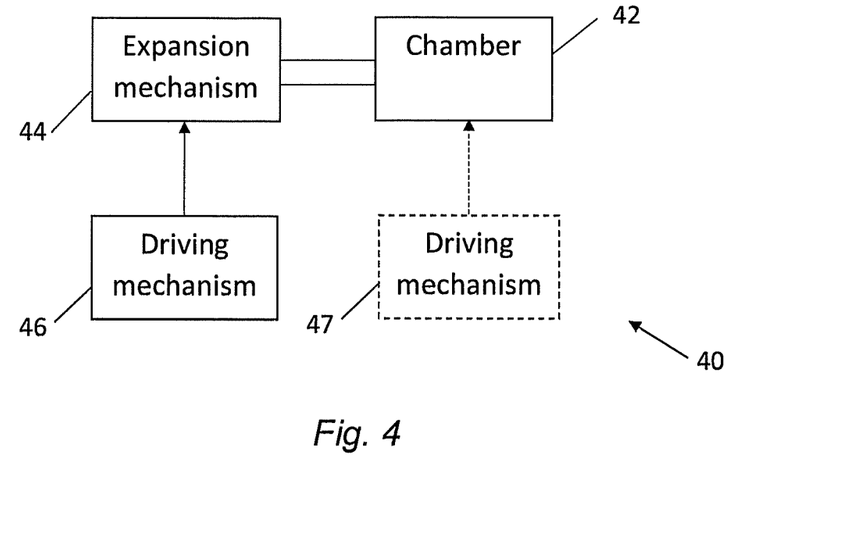
FIG. 4 is a block diagram of a system in accordance with an example embodiment.

FIG. 4 is a block diagram of a system, indicated generally by the reference numeral 40, in accordance with an example embodiment. The system 40 comprises a chamber 42, an expansion mechanism 44 and a first driving mechanism 46. The system 40 may further comprise a second driving mechanism 47.

The chamber 42 is a gas-retaining chamber (e.g. an air-filled chamber) having a membrane. The chamber is configured to surround at least part of a device (e.g. a portable electronic device, such as the device 10 or 30) in use. Thus, the chamber 42 may be the chamber 22 or 32 described above. The chamber 42 may therefore extend around the edge of a device being protected.

The expansion mechanism 44 comprises an expandable foam that is configured to inflate said chamber 42 in response to an activation signal. As discussed in detail below, the expansion mechanism 44 is controllable to provide rapid, reversible inflation of the membrane of the chamber 42. Before expansion, the expandable foam may be located within the chamber 42, or may be in fluid communication with the chamber, for example the expandable foam may be outside the chamber, and may be connected by air-tight tubing to the chamber (e.g. by channels in the device chassis).

The first driving mechanism 46 is configured to activate the expansion mechanism 44 in order to control a transition from a first mode of operation (in which the chamber 42 is not inflated) to a second mode of operation (in which the chamber 42 is inflated). As discussed in detail below, the expansion mechanism may comprise a rapidly expanding electric foam that is activated by the first driving mechanism 46.

In the first (non-inflated) mode of operation, vibrations are induced in the membrane of the chamber 42. The vibrations may be induced by the first driving mechanism 46 or the second driving mechanism 47 operating directly on the membrane of the chamber 42.

Figure 5:
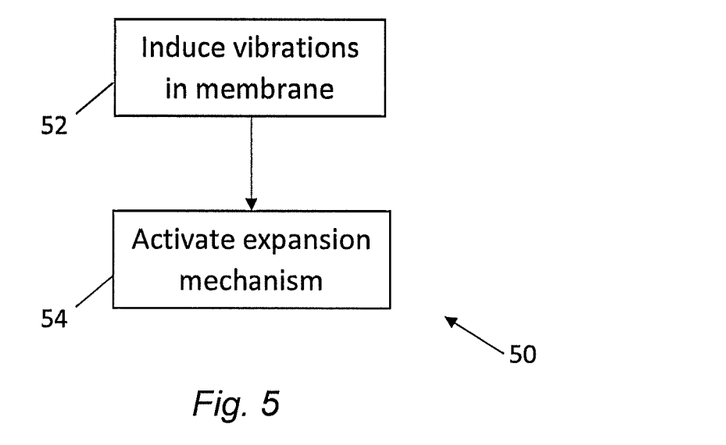
FIG. 5 is a flow chart showing an algorithm in accordance with an example embodiment.

FIG. 5 is a flow chart showing an algorithm, indicated generally by the reference numeral 50, in accordance with an example embodiment. The algorithm 50 may be implemented using the system 40 described above.

The algorithm 50 starts at operation 52, where vibrations are induced in the membrane of a chamber (e.g. the chamber 42) in a first mode of operation. The operation 52 may be implemented by driving the membrane of the chamber 42, for example using the second driving mechanism 47. Alternatively, the first driving mechanism 46 may be used (e.g. by directly driving the chamber 42). Indeed, the second driving mechanism 47 may be omitted in some example embodiments.

In the operation 52, the membrane of the chamber may be driven at audible frequencies in the first mode of operation so that the membrane acts as a loudspeaker of the relevant device (e.g. a loudspeaker of a mobile phone). Alternatively, or in addition, the membrane may be driven in order to provide haptic feedback to a user in the first mode of operation. When/if working as a speaker or haptic actuator, the system may be driven at relatively low power levels at different stimulating patterns by varying driving frequencies and voltages. For audio purposes, the stimulating pattern may be formed by frequencies in ranges of 100 Hz-15 kH and voltages up to 50 V. When the system is driven for haptic feedback, the stimulating pattern may, for example, be formed of short voltage bursts with periodic frequencies in range of 5 Hz to 1 kHz. In this way, the user may listen to sounds played in the air or feel (or otherwise experience) haptic vibrations.

In response to an activation signal or some other trigger (as discussed further below), the algorithm 50 moves to operation 54, where an expansion mechanism (e.g. a rapid expansion mechanism) is activated. The expansion mechanism comprises an expandable foam that is configured to inflate the chamber (e.g. the chamber 42) in response to an activation signal. The foam may be a rapidly changing volumetric actuator which upon exposure to external electric fields and voltage, for example, in ranges of 10-60 volts, rapidly increases its own volume by amounts such as 50%. The expandable foam may trigger an air pressure burst within the chamber in order to cause the inflation of the chamber.

The system 40 and the algorithm 50 therefore provide an active safety mechanism that uses a fast actuator (e.g. with response times of the order of a few milliseconds) to provide an inflatable assembly for protection purposes. The inflatable assembly may, for example, provide an expansion in volume of 50% within a few milliseconds, and may be enabled by exploiting materials based on graphene flake enriched conductive foam (e.g. an electrically triggerable graphene enabled electric foam). By way of example, rapidly expanding electrically conductive foams are available that are made of graphene flakes (up to 10% mass abundancy) sintered with electrically conductive elastomer (such as carbon powder silicone mixtures or polyurethane based porous rubbers). Suitable materials are described, by way of example, in the article "Electrically powered repeatable explosions using microtubular graphene assemblies" (Fabis Schütt et., al., Materials Today, Volume 48, pages 7-17, September 2021).

The expansion mechanism can therefore provide an inflatable loudspeaker or haptic feedback module that at least partially surrounds at least some of a device (e.g. a portable electronic device, such as a mobile phone) that can operate as a loudspeaker or haptic module and as a device drop protection arrangement (e.g. as a mechanical shock-absorber on demand) in different modes of operation.

The inflatable speaker arrangement may be used to replace traditional speakers for many portable electronic devices or may be provided in addition to such speakers.

Figure 6:
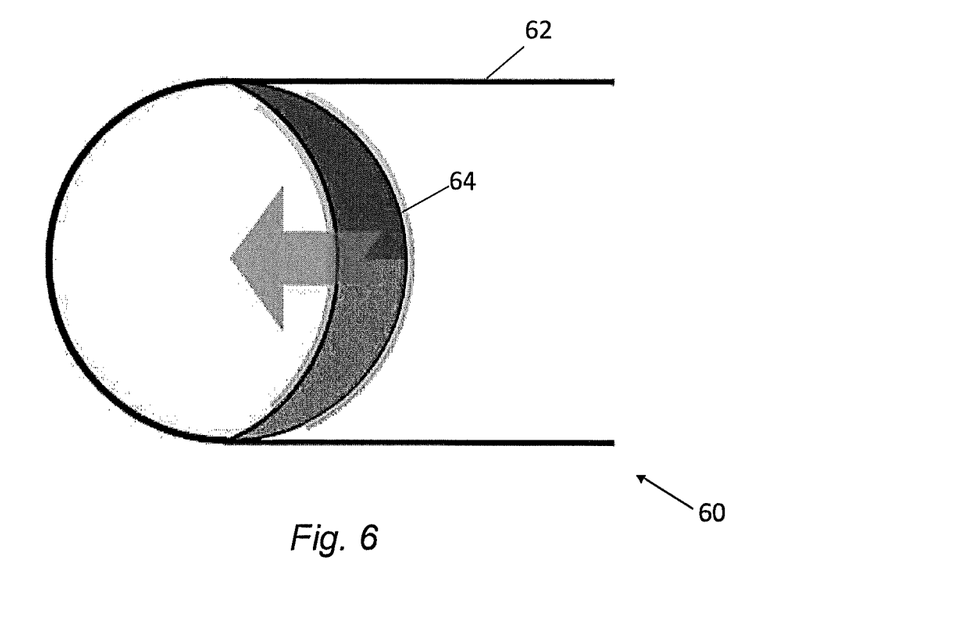
FIG. 6 shows an expansion mechanism in a first configuration in accordance with an example embodiment.

FIG. 6 shows an expansion mechanism, indicated generally by the reference numeral 60, in a first configuration in accordance with an example embodiment. The expansion mechanism 60 includes a tube channel 62 that can be provided around the edge of a device to be protected. The channel 62 includes an electrically activated foam 64. Upon activation, the form expands (e.g. by up to, or in excess of, 50% in volume), which results in air being pumped into a channel surrounding the device (e.g. the chamber 22, 32 or 42 described above).

Figure 7:
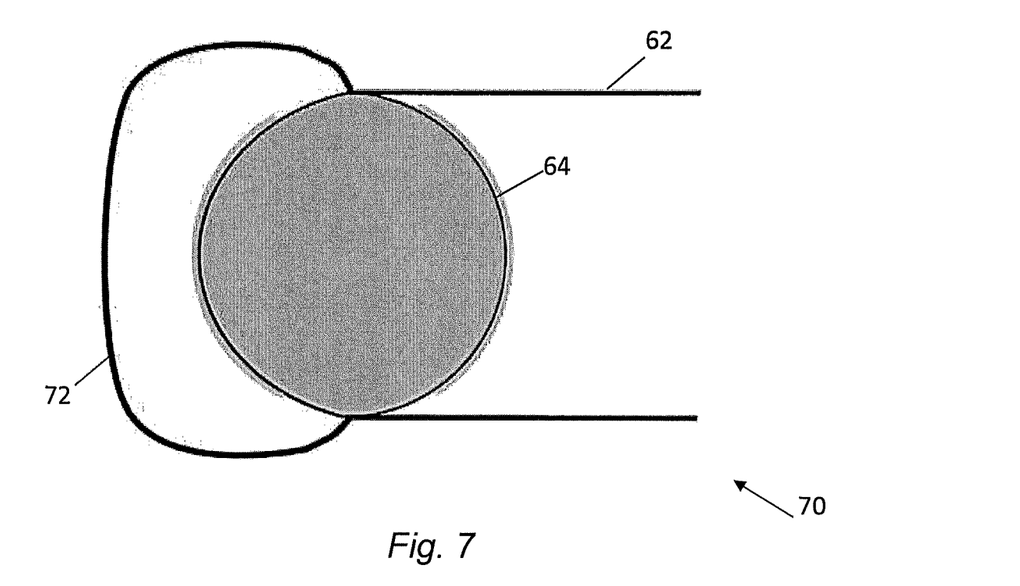
FIG. 7 shows an expansion mechanism in a second configuration in accordance with an example embodiment.

FIG. 7 shows an expansion mechanism, indicated generally by the reference numeral 70, in a second configuration in accordance with an example embodiment. The expansion mechanism 70 includes the tube channel 62 and the foam 64 of the expansion mechanism 60. In the expansion mechanism 70, the foam has expanded driving an air pressure burst to inflate the membrane surrounding the channel. The membrane may be made of thin elastomer (such as latex with thicknesses, for example, in range of 20-300 micrometres) which easily expands upon increased air pressure to form an air balloon bubble 72 around the device which can damp mechanical shock in case the device is dropped and/or can be used for audio and/or haptic signal generation.

In the example embodiments described above, all edges of a device chassis can be covered and protected against mechanical impact shock by providing an inflatable chamber surrounding the device edges. Thus, an expandable channel cavity extends around all edges of the device and can be inflated to provide mechanical protection (and/or for audio/ haptic signal generation). Moreover, a single driver module may be used for all modes of operation.

In an alternative implementation, a channel cavity may be implemented using multiple non-continuous sub-units around the edges of the device. The sub-units can be driven individually as needed to provide protection and audio or haptic functionalities. For example, one or two sub-units along the edge(s) can be designed to maximise audio play efficiency with a thinner membrane. By way of example, thinner membranes (e.g. of the order of 50-100 microns) could be used for lower to mid-range audio frequencies, and thicker membranes (e.g. of the order of 200 microns) could be used for higher audio frequencies. For example, one or more sub-units with the thicker membrane could be located along the edge(s) or at the corner(s) of the device.

Figure 8:
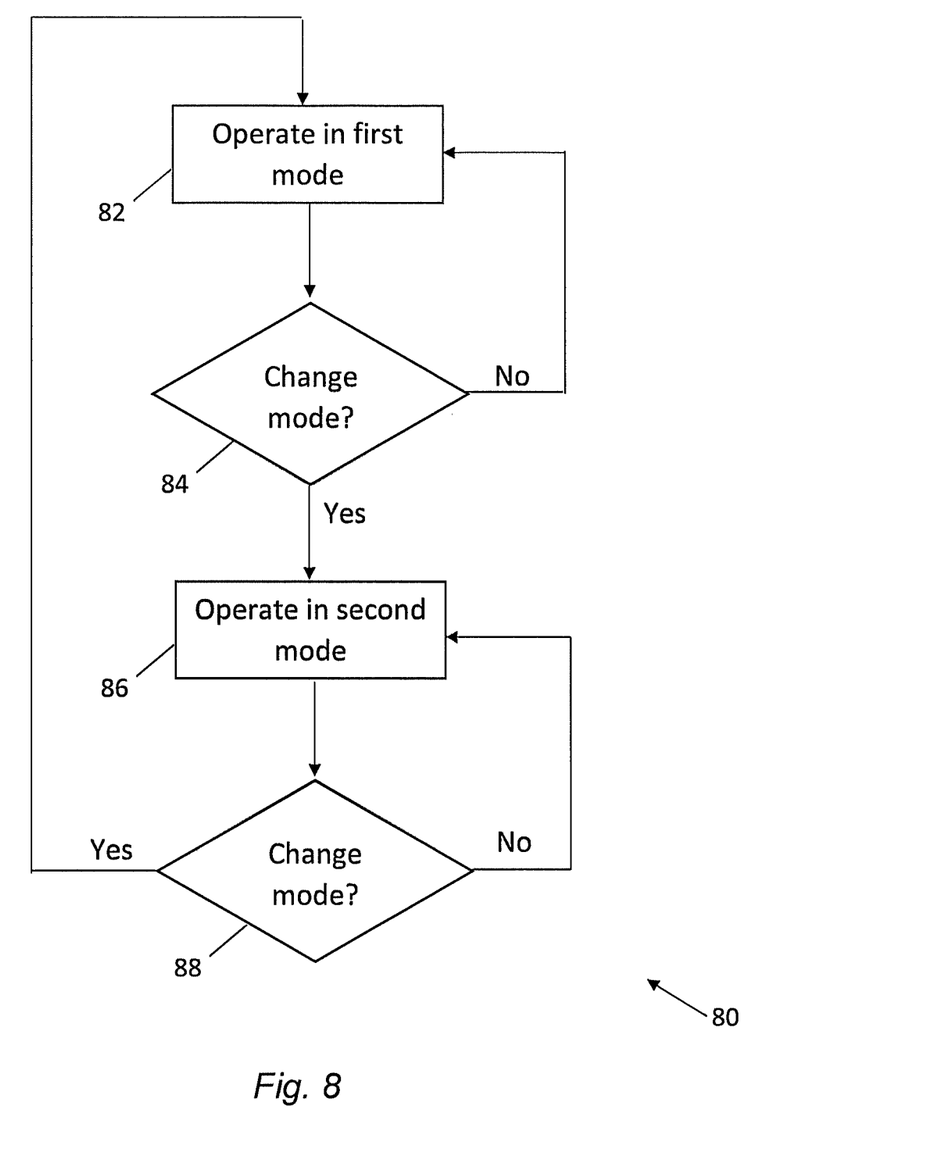
FIG. 8 is a flow chart showing an algorithm in accordance with an example embodiment.

FIG. 8 is a flow chart showing an algorithm, indicated generally by the reference numeral 80, in accordance with an example embodiment.

The algorithm 80 starts at operation 82, where a system (such as the system 40 described above) is operating in a first mode of operation. In the first mode of operation, the device described herein is operating as a loudspeaker, a haptic module or some similar module. As discussed above, the operation 82 may be implemented by driving a membrane of a gas-retaining chamber to induce vibrations in the membrane.

At operation 84, a determination is made regarding whether a change in mode is required. If not, the algorithm returns to operation 82; otherwise, the algorithm moves to operation 86.

In operation 86, the system is operating in a second mode of operation. As described above, in the second mode of operation, an expansion mechanism (e.g. a rapid expansion mechanism) of the device described herein is activated to inflate the chamber.

At operation 88, a determination is made regarding whether a change in mode is required. If not, the algorithm returns to operation 86; otherwise, the algorithm moves to operation 82.

In order to return to the first mode of operation, the expansion mechanism described above is configured to deflate the membrane in response to a removal of said activation signal. In some example embodiments, the deflation of the membrane may occur as soon as the signal to inflate the membrane is removed.

In the use of the algorithm 80, a device may be provided having inflatable speaker edges that may be used for one or more of: protection; as audio speaker; or as a haptic actuator. A control module may be provided that monitors conditions indicative of an accidental drop of the device being protected (e.g. a "free-fall" condition). When such a condition is detected, the expansion mechanism is activated at the device to provide for shock absorption. The expansion mechanism can be activated by controlling graphene enabled electric foam, causing the foam to undergo thermal expansion. The mechanism may be repeatable allowing the activation of the expansion mechanism on multiple occasions.

Figure 9:
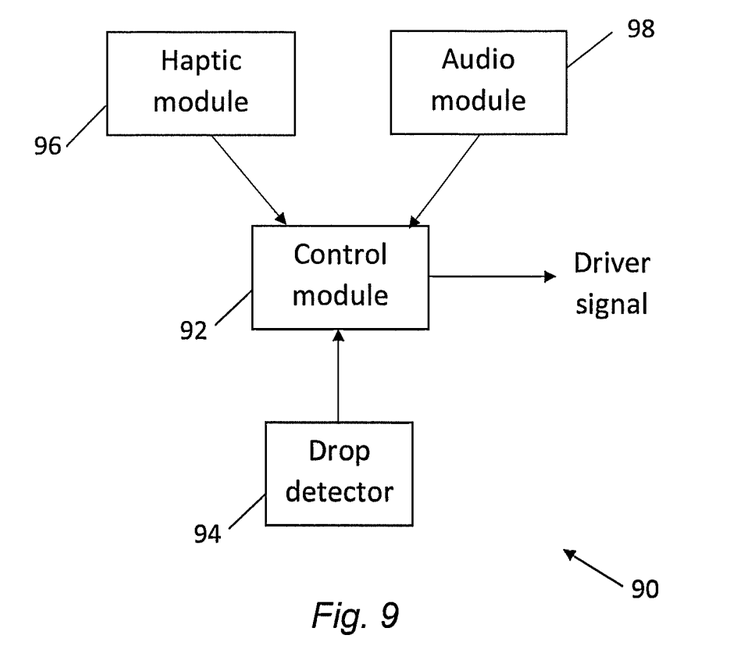
FIG. 9 is a block diagram of a system in accordance with an example embodiment.

FIG. 9 is a block diagram of a system, indicated generally by the reference numeral 90, in accordance with an example embodiment. The system 90 comprises a control module 92, a drop detector 94, a haptic module 96 and an audio module 98. The system 90 may be used to implement one or both of the algorithms 50 or 80 described above.

The control module 92 receives signals from the drop detector 94, the haptic module 96 and the audio module 98, and generates one or more driver signals. The driver signals are used to control driving mechanisms, such as the driving mechanisms 46 and 47 of the system 40 described above. It should be noted that although one control module is shown in FIG. 9, the functionality of the control module could be provided by multiple control modules (e.g. with different control modules being operational in different modes of operation and/or with different control modules for controlling the drop detector and for generating the signals for driving the membrane).

In an implementation of the algorithm 50, in a first mode of operation, the control module 92 may provide driver signals based on inputs received from the haptic module 96 or the audio module 98 (thereby implementing the operation 52 of the algorithm 50). Note that one of the haptic module 96 and the audio module 98 may be omitted in some example embodiments. A second mode of operation may be entered in response to an output from the drop detector 94 triggering the change in operation mode (thereby implementing the operation 54 of the algorithm 50). In the second mode of operation, the control module 92 provides a driver signal activating the relevant expansion mechanism.

Similarly, in an implementation of the algorithm 80, in the operation 82, the control module 92 may provide driver signals based on inputs received from the haptic module 96 or the audio module 98 (note, again, that one of the haptic module 96 and the audio module 98 may be omitted in some example embodiments). At operation 84, a determination is made regarding whether the output of the drop detector 94 indicates that the second mode of operation should be entered. If so, the control module 92 provides a driver signal (in the operation 86) activating the relevant expansion mechanism.

The drop detector 94 may be implemented in a number of ways. For example, an inertial measurement unit (IMU), accelerometer or gyroscope may be used. Alternatively, or in addition, an imaging device (such as a camera) may be used. The camera may be provided with a sufficiently high sample rate (e.g. above 1 kHz) to enable enough images to be taken to enable the dropping of a device to be detected based on differences between images taken sufficiently quickly to enable the control module 92 to activate the second mode of operation. The skilled person will be aware of other options for implementing the drop detector 94.

Figure 10:
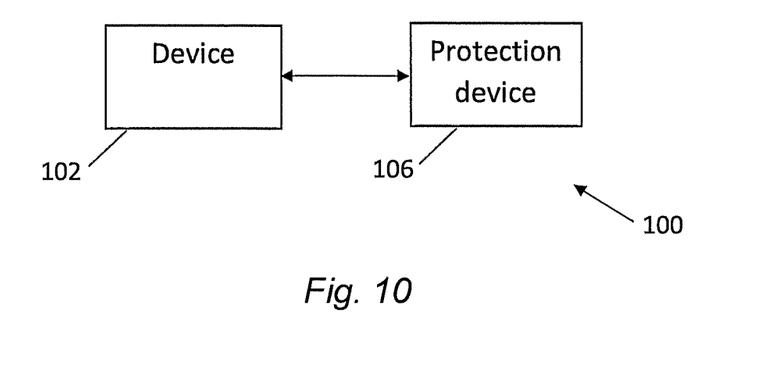
FIG. 10 is a block diagram of a system in accordance with an example embodiment.

FIG. 10 is a block diagram of a system, indicated generally by the reference numeral 100, in accordance with an example embodiment. The system 100 comprises a device 102 and a protection device 106. The device 102 is a device being protected, such as a portable electronic device (e.g. a mobile phone, computer, camera, drone etc.). The protection device 106 may comprise a removable device case and may, for example, receive an activation signal from the device 102. A communication mechanism may be provided between the device 102 and the protection device 106 (e.g. using a wired or wireless connection).

The system 90 described above (or some similar circuitry) may form part of the device 102 and the system 40 described above (or some similar circuitry) may form part of the protection device 106. Thus, some or all of the system 90 may be separated from some or all of the system (such as the system 40) being driven under the control of the system 90. The device 102 and the protection device 106 (e.g. the respective systems 90 and 40) may be electrically connected (e.g. using a wired or wireless connection, such as Bluetooth®).

Figure 11:
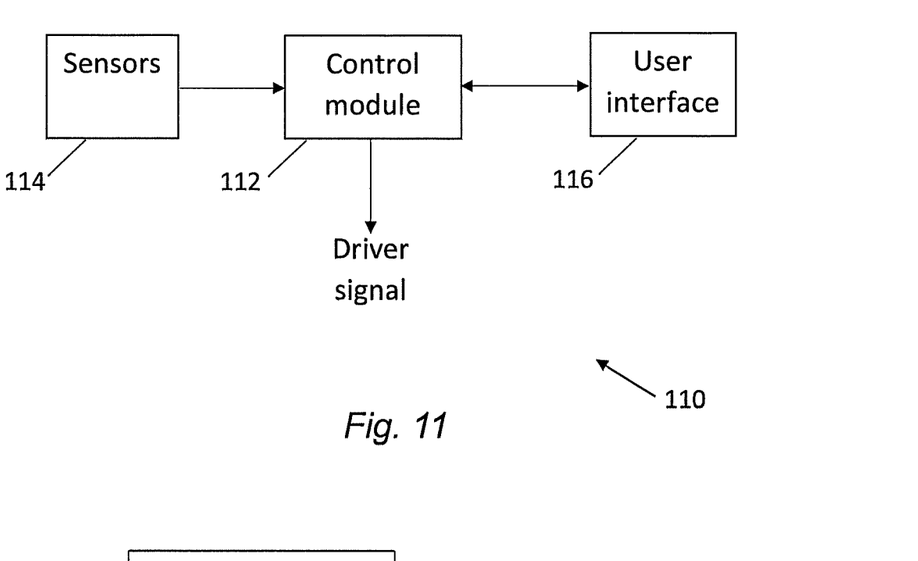
FIG. 11 is a block diagram of a system in accordance with an example embodiment.

FIG. 11 is a block diagram of a system, indicated generally by the reference numeral 110, in accordance with an example embodiment. The system comprises a control module 112, one or more sensors 114 and a user interface 116. The control module 112 provides a driver signal and may be the control module 92 of the system 90 described above. The control module 112 may implement one or both of the algorithms 50 or 80 described above or the algorithm 120 described below.

The user interface 116 may provide an application ("App") that can be operated by a user, enabling the user to control aspects of the functionality of the system 110.

The user interface 116 may provide the user with a first input to enable a user to activate the application. That input may be used to activate the control module 112.

When activated, the control module 112 may generate an activation signal in the event that input(s) from one or more of the sensors 114 (e.g. an IMU sensor) are indicative of a device having been dropped. The driver signal output by the control module 112 may drive an air retaining membrane of said device in response to said activation signal, wherein the expansion mechanism comprises an expandable foam that is configured to inflate rapidly said membrane in response to said output.

Figure 12:
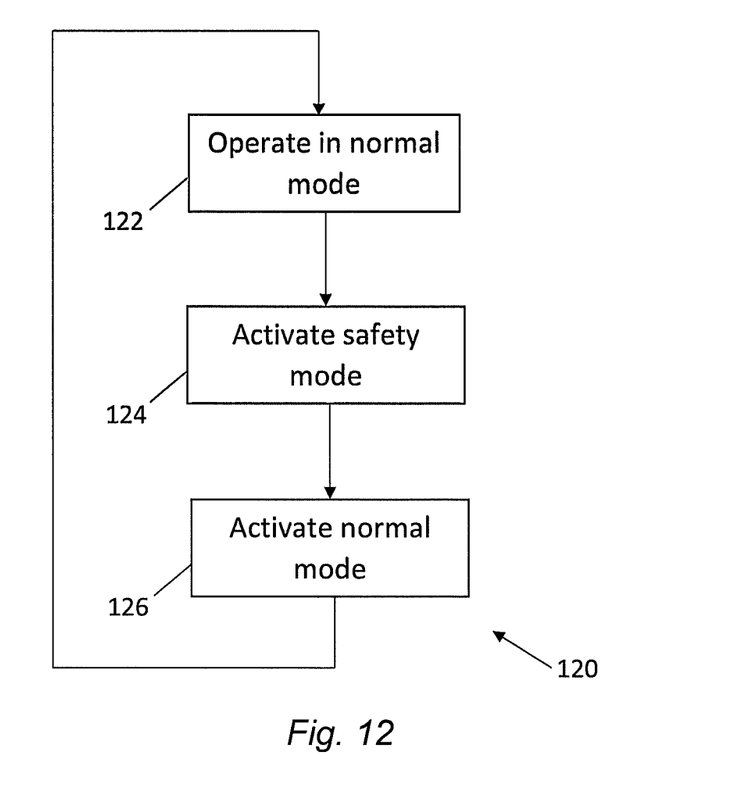
FIG. 12 is a flow chart showing an algorithm in accordance with an example embodiment.

FIG. 12 is a flow chart showing an algorithm, indicated generally by the reference numeral 120, in accordance with an example embodiment. The algorithm 120 may be implemented using the system 110 described above.

At operation 122, a device, such as a portable electronic device (e.g. a mobile phone, computer, camera, drone etc.), is operating in a "normal" mode, in which a protection module (such as the system 40) is not activated.

At operation 124, a safety mode is entered (e.g. in response to an instruction by a user). By way of example, the user may use the user interface 116 to activate an App (e.g. a "Safe Drop" App) when feeling that he/she is going under risky situations (playing outside, running etc.) and when the device may need an active protection mechanism. The App may use an IMU sensor (or some other sensor, such as an accelerometer or a gyroscope) in the device to recognise free-fall conditions and immediately trigger an expandable foam for rapid expansion ("electric explosion") to instantaneously deliver high pressure around the edge membranes for mechanical shock absorption.

At operation 126, the normal mode is activated again (e.g. in response to an input at the user interface 116).

It should be noted that is some example embodiments, the App or the safety mode may be active by default. Indeed, some example embodiments may omit the "normal" mode of the algorithm 120 so that the safety mode is always active.

In some example embodiments, the transition between the normal and safety modes of the algorithm 120 may be automatic (e.g. in response to the device detecting environmental changes). Thus, the algorithm 120 may not require user input.

Figure 13:
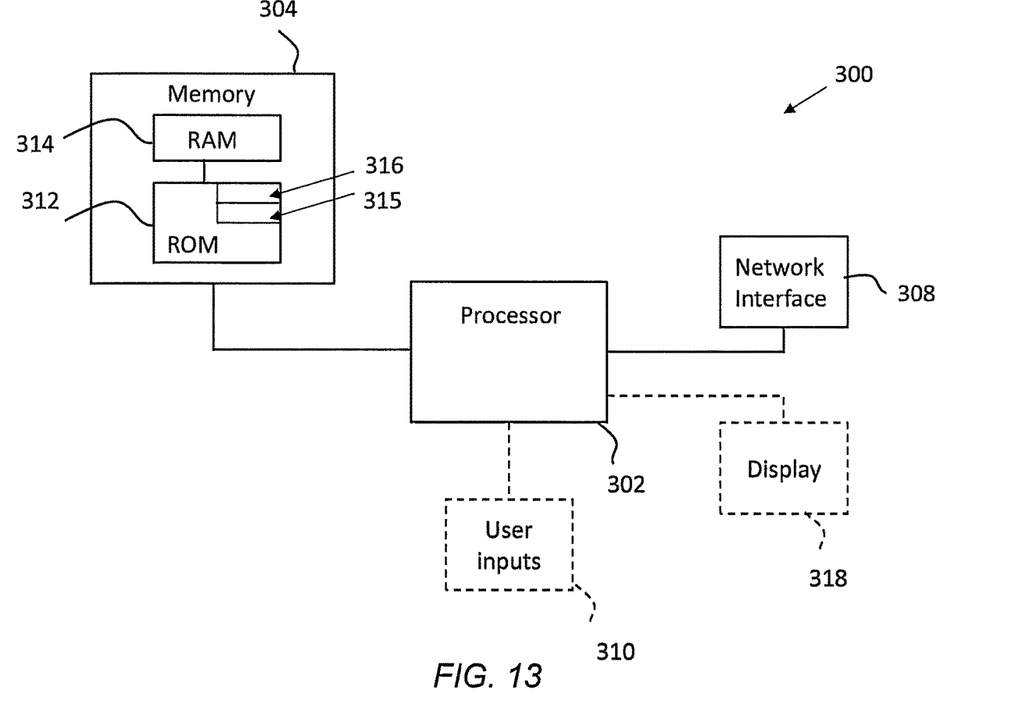
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 50, 80, and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14:
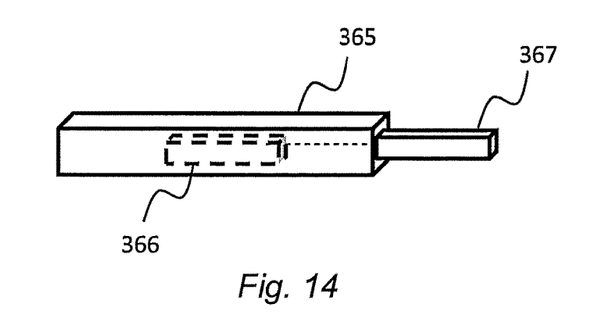
FIG. 14 shows an example of tangible media for storing computer-readable code which when run by a computer may perform methods according to example embodiments described above.

FIG. 14 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 5, 8 and 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
a gas-retaining chamber having a membrane, said chamber configured to surround at least part of a device in use;
an expander comprising an expandable foam that is configured to inflate said chamber in response to an activation signal;
a driver for driving the membrane to induce vibrations in the membrane in a first mode of operation; and
an activator for activating said expander in a second mode of operation.

2. An apparatus as claimed in claim 1, wherein said expandable foam is configured to trigger an air pressure burst within said chamber in order to inflate said chamber in said second mode of operation.

3. An apparatus as claimed in claim 1, wherein said foam is within said chamber or is in fluid communication with the chamber.

4. An apparatus as claimed in claim 1, wherein said driver for driving said membrane is configured to induce vibrations at audible frequencies in said first mode of operation.

5. An apparatus as claimed in claim 1, wherein said driver for driving said membrane is configured to provide haptic feedback to a user in the first mode of operation.

6. An apparatus as claimed in claim 1, further comprising:
a receiver for receiving the activation signal from said device.

7. An apparatus as claimed in claim 6, further comprising a wired or wireless connection for receiving the activation signal from said device.

8. An apparatus as claimed in claim 1, further comprising:
a generator for generating said activation signal.

9. An apparatus as claimed in claim 8, wherein said generator for generating said activation signal comprises at least one of an inertial measurement unit, an accelerometer, a gyroscope, or an imaging device.

10. An apparatus as claimed in claim 1, wherein the expandable foam is one of a graphene enabled electric foam or a graphene flake enriched conductive foam.

11. An apparatus as claimed in claim 1, wherein the expander is configured to deflate said chamber in response to a removal of said activation signal.

12. A system comprising the apparatus as claimed in claim 1 and further comprising said device.

13. A method, comprising:
driving a membrane of a gas-retaining chamber to induce vibrations in the membrane in a first mode of operation, wherein said membrane is configured to surround at least part of a device; and
activating an expander in a second mode of operation, wherein the expander comprises an expandable foam that is configured to inflate said chamber in response to an activation signal.

14. A method as claimed in claim 13, wherein activating said expander comprises driving said expandable foam.

15. A non-transitory computer program storage device readable with an apparatus, tangibly embodying a program of instructions executable with the apparatus to perform at least the following:
driving a membrane of a gas-retaining chamber to induce vibrations in the membrane in a first mode of operation, wherein said membrane is configured to surround at least part of a device; and
activating an expander in a second mode of operation, wherein the expander comprises an expandable foam that is configured to inflate said chamber in response to an activation signal.

* * * * *